United States Patent [19]

Kimata et al.

[11] Patent Number: 5,320,433
[45] Date of Patent: Jun. 14, 1994

[54] ROLLING CONTACT BEARING ASSEMBLY

[75] Inventors: Kei Kimata, Aichi; Kenji Hibi, Gifu; Yukitaka Hayakawa; Yasuhiro Shimizu, both of Kuwana, all of Japan

[73] Assignee: NTN Corporation, Osaka, Japan

[21] Appl. No.: 965,014

[22] Filed: Oct. 23, 1992

[30] Foreign Application Priority Data

Mar. 31, 1992 [JP] Japan ............... 4-28054[U]

[51] Int. Cl.$^5$ ............................................ F16C 33/66
[52] U.S. Cl. ...................................... 384/473; 384/475
[58] Field of Search ............. 384/473, 475, 513, 512, 384/474, 499

[56] References Cited

U.S. PATENT DOCUMENTS

| | | | |
|---|---|---|---|
| 4,334,720 | 6/1982 | Signer | 384/475 |
| 4,824,264 | 4/1989 | Hoebel | 384/475 |
| 4,858,427 | 8/1989 | Provenzano | 384/473 |
| 5,106,209 | 4/1992 | Atkinson et al. | 384/475 |

FOREIGN PATENT DOCUMENTS 64-718  1/1989  Japan .

Primary Examiner—Lenard A. Footland

[57] ABSTRACT

A rolling contact bearing assembly comprises an inner race member adapted to be mounted on a rotatable element and including a spacer disposed axially adjacent the inner race. This inner race member is formed with a lubricant reservoir for accommodating a lubricant and a lubricant flow passage communicating the reservoir with a space defined between the inner and outer race, in which space rolling elements are accommodated. At least a portion of said lubricant flow passage is defined by minute interstices which are formed by surface roughness left by surface roughening at an interface between mutual contact faces of a plurality of component parts forming the inner race member.

12 Claims, 6 Drawing Sheets

ROLLING CONTACT BEARING ASSEMBLY

BACKGROUND OF THE INVENTION

1. Field of the Invention

The present invention generally relates to a rolling contact bearing assembly and, in particular, to an angular contact bearing assembly.

2. Description of the Prior Art

In a rolling contact bearing assembly in a machine tool for the support of a high speed rotating main shaft of the machine tool, with an increase in speed of rotation of the main shaft, an air oil lubricating system, an oil mist lubricating system, a jet lubricating system or the like is generally employed. Since any one of those lubricating systems employs a pumping device for jetting the lubricant, requiring a complicated fluid circuit, a grease lubricating system is still largely practiced due to its excellent maintenance.

In the grease lubricating system, grease is filled inside the bearing assembly, more specifically, in gaps delimited among various component parts such as, for example, rolling elements, inner and outer races and ball or roller retainers. In this case, where the quantity of grease retained in the various gaps is small, a problem occurs in that the length of time over which the lubrication can be effected tends to be shortened.

Although the quantity of the grease filled in the gaps in the bearing assembly can be increased to some extent, the filling of the grease in an increased quantity may bring about such problems that the resistance induced by a stirring of the grease evolves a relatively large amount of heat and that a make-ready operation to facilitate a discharge of the excessive grease and/or to stabilize the operativity of the bearing assembly takes a relatively long time. Especially in the case where the bearing assembly is used in the machine tool, the heat evolved in the bearing assembly adversely affects a machining tolerance and must therefore be minimized.

In an attempt to increase the liftime during which the lubricating system works satisfactorily, the Japanese Laid-open Utility Model Publication 64-718 has suggested the provision of a grease reservoir in a ball or roller retainer so that the grease or a base oil thereof can be supplied through one or more minute through-holes relying on the fluidity thereof. However, there is no sufficient space available in the retainer for the formation of the grease reservoir and, furthermore, a sufficient effect of suppressing the flow of the lubricant cannot be obtained because of a processing limitation in defining a bore size of the through-holes and, therefore, the lubricant tends to be supplied excessively.

SUMMARY OF THE INVENTION

The present invention has for its essential object to provide an improved rolling contact bearing assembly having the lubricant filled therein, which is effective to accomplish an oiling for a prolonged period of time, to suppress an initial heat emission and also to minimize the time required to perform a make-ready operation.

To this end, the rolling contact bearing assembly according to the present invention comprises an inner race member adapted to be mounted on a rotatable element and including a spacer disposed axially adjacent an inner race. This inner race member is formed with a lubricant reservoir for accommodating a lubricant and a lubricant flow passage communicating the reservoir with a space defined between an inner race and an outer race, in which space rolling elements are accommodated. At least a portion of said lubricant flow passage is defined by minute interstices which are formed by surface roughness left at an interface between mutual contact faces of a plurality of component parts forming the inner race member.

The component parts forming the lubricant flow passage may be two separate elements forming the spacer, respectively. Alternatively, one of the component parts forming the lubricant flow passage may be the inner race while the other thereof is the spacer. Again alternatively, the component parts forming the lubricant flow passage may be dedicated component parts added for the purpose of forming the minute interstices.

The lubricant to be filled in the reservoir may be a commercially available semi-solid or solid grease, liquid grease, plastics grease, oil impregnated synthetic resin and a piece of fabric or felt impregnated with the lubricant. The plastics grease is a solid composition prepared by mixing grease with a synthetic resin such as polyethylene having a super high molecular weight or a low molecular weight, heating the mixture to melt together and then cooling the heated mixture. In a certain variation of this plastics grease which has recently been developed, the plastics grease has a capability of flowing an oil component of the plastic grease little by little.

The surface roughness on the contact face is chosen to have a maximum height Rmax within the range of 0.2 to 5 82 m and, preferably, within the range of 0.2 to 3 $\mu$m. If the surface roughness is smaller than 0.2 $\mu$m, the interstice would be too minute for the lubricant to flow therethrough, but if the surface roughness is greater than 5 $\mu$m, the interstices would be too great for the lubricant to be supplied properly. Therefore, unless the surface roughness is chosen to be within the above described range, a satisfactory control of the supply of the lubricant cannot be achieved.

According to the foregoing construction, the amount of the lubricant retained beforehand in the vicinity of the rolling elements within the bearing assembly is chosen to be small and the most part of the lubricant is filled into and then sealed in the lubricant reservoir. The lubricant or a component thereof within the lubricant reservoir can flow through the minute interstices in the lubricant flow passage by a capillary action and/or under the influence of a centrifugal force towards the neighborhood of the rolling elements.

In such case, since the supply of the lubricant is carried out by causing it to flow through the minute interstices formed by the surface roughness, an orifice or throttling effect of the amount of the lubricant flowing can be enhanced and, hence, the lubricant can be supplied little by little for a prolonged period of time.

Also, since the capillary action is utilized for the flow of the lubricant through the minute interstices, the supply of the lubricant can be effected in a stabilized fashion without being adversely affected by the number of revolutions as compared with the case in which only the centrifugal force is utilized for the same purpose.

According to a preferred embodiment of the present invention, the contact face having the surface roughness is also formed with a mesh pattern of cross grooves each having a depth greater than the depth of each recesses forming the surface roughness. Projections forming the surface roughness together with the recesses on the contact face have their tip smoothed.

According to the construction of this preferred embodiment of the present invention, since the surface roughness is formed by smoothing the tips of the projections, the tips of the projections will no longer be depressed at the time of a press-fitting of the above described component parts forming the lubricant flow passage even though there may be a variation in clearance between and/or pressing force to be applied to the component parts, and therefore, any possible change of the minute interstices can be minimized. If the surface roughness is made further fine to make the minute interstices more dense, the orifice or throttling effect can further be enhanced.

In addition, even though the interstices are minute, the formation of the mesh pattern of the cross grooves ensures a stabilized supply of the lubricant. In this case, since some of the cross grooves extend so as to intersect the remaining cross grooves thereby to form the mesh pattern, it is possible to accomplish a smooth outflow of the lubricant by aligning the direction of inclination of the cross grooves regardless of the direction of a rotary shaft on which the bearing assembly is mounted. The formation of the cross grooves can readily be attained by the use of any known machining or cutting process.

According to another preferred embodiment of the present invention, a gap is formed between an end face of the inner race and a corresponding end of the spacer, which is held in contact with such end face of the inner race, for the flow of the lubricant therethrough. According to this preferred embodiment, the lubricant within the lubricant reservoir can flow through the gap into the space defined between the outer race 3 and the inner race 2 or flow through the minute interstices on the contact face and then through the gap into the space. Therefore, by adjusting the width of the gap, the quantity of the lubricant to be supplied into the space can be controlled.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

In describing various preferred embodiments of the present invention, the present invention will be described as applied to a dual or single angular contact bearing assembly so disposed as to intervene between a first structural element, for example, a driving or driven shaft, and a second structural element, for example, a machine casing, enclosing the first structural element.

Figure 1:
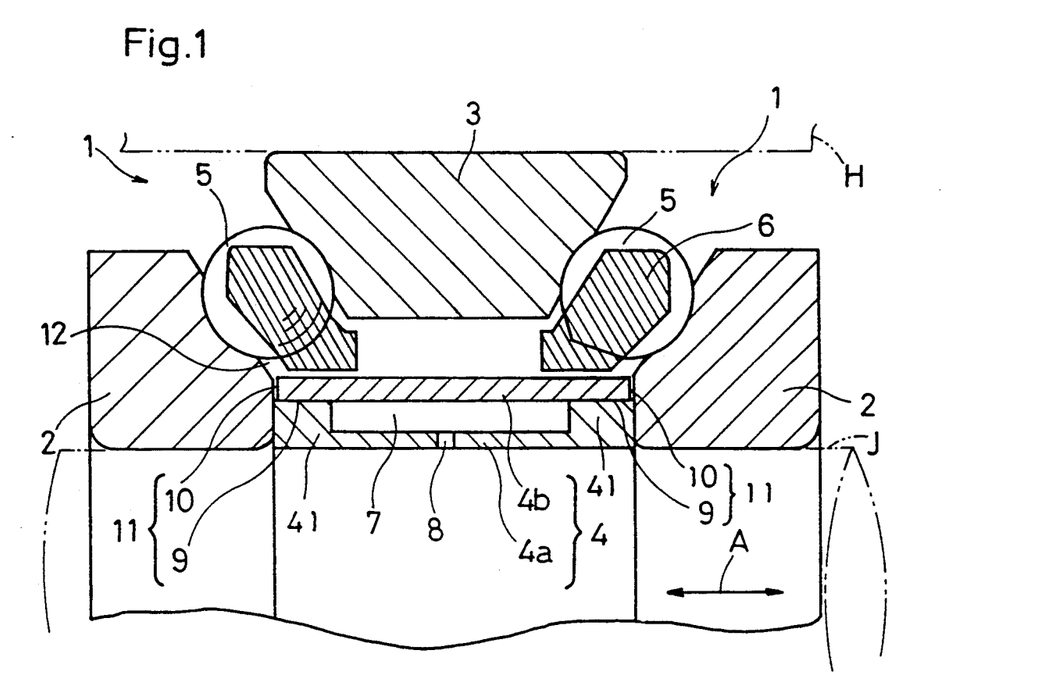
FIG. 1 is a fragmentary transverse sectional view of a ball bearing assembly according to a first preferred embodiment of the present invention.
Figure 2:
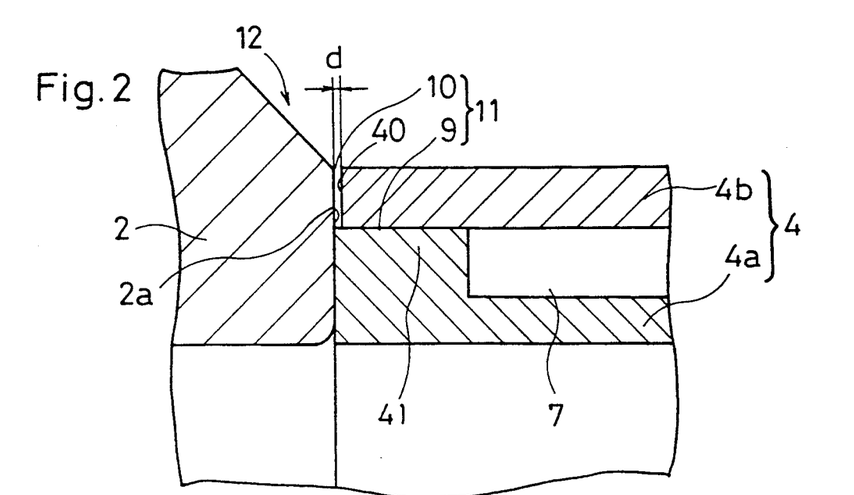
FIG. 2 is a fragmentary transverse sectional view, on an enlarged scale, of a portion of the ball bearing assembly shown in FIG. 1.

Referring first to FIGS. 1 and 2 showing a first embodiment of the present invention, the dual angular contact bearing assembly shown therein comprises first and second bearings 1 of generally identical construction including an inner race member and a common outer race 3. The inner race member is constituted by a pair of first and second inner races 2 and a spacer 4 interposed between the first and second inner races 2 and positioned radially inwardly of the outer race 3. The outer race 3 cooperates with the inner races 2 to carry first and second circumferentially extending rows of rolling elements such as, for example, balls 5, the first ball row being situated between the first inner race 2 and the common outer race 3 while the second ball row is situated between the second inner race 2 and the common outer race 3. The rolling elements 5 of each bearing 1 are retained in position within respective pockets defined in an associated ball retainer 6.

For the purpose of description of the present invention, the inner races 2 are mounted on the shaft, shown by the phantom line J, for rotation together therewith and the outer race 3 is secured to the machine casing H enclosing the shaft J.

In the instance shown in FIGS. 1 and 2, the spacer 4 is of two-piece construction including inner and outer tubular members 4a and 4b coaxial with each other. The inner tubular member 4a has a circumferentially extending annular groove defined therein radially inwardly from an outer peripheral surface thereof, leaving a pair of radially outwardly protruding lands 41 adjacent opposite ends thereof. This circumferentially extending annular groove in the inner tubular member 4a, when the inner tubular member 4a is placed inside the outer tubular member 4b, defines a reservoir 7 for accommodating a quantity of lubricant in cooperation with the outer tubular member 4b.

Although not essential in the practice of the present invention, at least one perforation 8 is formed in an intermediate wall of the inner tubular member 4a aligned with the reservoir 7 so as to communicate with the reservoir 7 for avoiding a development of a negative pressure inside the reservoir 7.

While the inner tubular member 4a is placed inside the outer tubular member 4b with the radially outwardly protruding lands 41 held in tight contact with the inner surface of the outer tubular member 4b, the radially outwardly extending lands 41 of the inner tubular member 4a have contact faces 9 which are spaced in an axial direction, shown by the arrow A, of the inner race member and which are held in contact with the inner surface of the outer tubular member 4b. Since each of the contact faces 9 of the inner tubular member 4a or the contact face 9 of the outer tubular member 4b has surface projections ranging in maximum height Rmax from 0.2 to 5 μm which are formed as a result of a surface grinding operation applied thereto. Due to the presence of the surface projections in each of the contact face 9, a multiplicity of minute interstices are formed between the inner tubular member 4a and the outer tubular member 4b.

As best shown in FIG. 2, a circumferentially extending annular gap 10 of a slight width d is defined between an inner end face 2a of each of the first and second inner races 2 and a corresponding one of opposite end faces 40 of the outer tubular member 4b which may be held in abutment with the end face 2a of the associated inner race 2. This annular gap 10 serves as a passage through which the lubricant flow into a corresponding space 12 that is defined between the respective inner race 2 and the outer race 3 for accommodating the associate circumferential row of the balls 5. The annular gap 10 between each inner race 2 and the outer tubular member 4b and the minute interstices defined by the surface projections in each contact faces 9 altogether are communicated with each other to define a respective lubricant flow passage 11.

At the time of assemblage of the angular contact bearing assembly the lubricant is generally filled in the spaces 12. However, in the practice of the present invention, the quantity of the lubricant filled in the spaces 12 is chosen to be smaller than that generally employed and, instead, the lubricant is filled in the reservoir 7 in a quantity as much as possible.

According to the foregoing embodiment of the present invention, the lubricant or a component thereof filled in the reservoir 7 runs axially outwardly in opposite directions from the reservoir 7 towards the annular gaps 10 through the minute interstices in the contact faces 9 by capillary action. The lubricant or the component thereof running by capillary action into the annular gaps 10 then flows smoothly in a direction radially outwardly through the annular gaps 10 under the influence of a centrifugal force developed during the rotation of the inner races 2 relative to the common outer race 3 to lubricate track faces defining the spaces 12 defined between the inner race 2 and the outer race 3. Where the lubricant is a semi-solid grease, mainly a grease base oil is separated from a viscosity intensifying agent to run outwardly. The amount of the lubricant or the component thereof which flows by capillary action along the contact faces 9 of the spacer 4 may be adjusted by adjusting the surface roughness of each of the contact face 9.

In the angular contact bearing assembly constructed as hereinbefore described, since the lubricant or the component thereof filled in the reservoir 7 is used little by little, the self-supply of the lubricant or the component thereof can be possible for a substantially prolonged period of time. Because of this, the quantity of the lubricant to be filled in the spaces 12 can be minimized while permitting an oiling of a small quantity of lubricant and, hence, not only can the quantity of heat evolved by a stirring resistance be reduced, but also the time required to perform a priming operation of the angular contact bearing assembly can be reduced. Therefore, the angular contact bearing assembly according to the present invention can be advantageously employed in the environment wherein an increase in temperature in a bearing assembly is required or desired to be suppressed and a ready and smooth run of a movable part is also required or desired, for example, for the support of a main shaft of a machine tool.

The lubricating system accomplished according to the present invention makes use of the capillary flow of the lubricant through the interstices formed by roughening the contact faces 9. Accordingly, as compared with the lubrication done by the utilization of, for example, the sole centrifugal force developed by the rotation, not only can the quantity of the lubricant actually used for lubrication be minimized, but also the lubricant can be supplied for a prolonged period of time. The utilization of the capillary action makes it possible to accomplish the continuous lubrication in a stable fashion for a prolonged period of time without being adversely affected by the number of revolutions of the rotary element of the bearing assembly and the centrifugal force developed by the rotation of the rotary element.

Moreover, in the present invention, the minute interstices formed by roughening the contact faces 9 are utilized for the flow of the lubricant or the component thereof. Unlike the utilization of a through-hole or any other opening formed as a passage for the flow of the lubricant, an orifice effect for the flow of the lubricant will not be affected by machining limitations which are generally found in boring to form the through-hole or any other opening and a simple and easy machining process is sufficient to accomplish the little by little oiling of the lubricant or the component thereof.

In addition, an adjustment of the width d of each of the annular gap 10 permits a control of the quantity of the lubricant to be supplied. However, in the practice of the present invention, the use of the annular gaps 10 is not always essential and, where no annular gaps 10 are employed, either one or both of the end face 2a of each of the inner races 2 and the adjacent end face 40 of the outer tubular member 4b which confronts the end face 2a of the respective inner race 2 may be surface roughened to provide minute interstices which eventually form the lubricant flow passage 11 together with the minute interstices in the contact faces 9.

Yet, since the reservoir 7 is defined inside the spacer 4 forming a part of the inner race member, specifically between the inner and outer tubular members 4a and 4b of the spacer 4, a relatively large volume can be secured as compared with the case in which reservoirs are formed in, for example, the retainers 6, making it possible to accommodate an increased quantity of the lubricant that is required to accomplish the lubrication for a prolonged period of time. The filling of the lubricant into the reservoir 7 is easy to achieve since, in the foregoing embodiment of the present invention, the separate members, i.e., the inner and outer tubular members 4a and 4b, are employed to form the single spacer 4.

It is to be noted that the surface projections left by surface roughening may be defined only on each of the contact surfaces 9 of the radially outwardly protruding lands 41 in the inner tubular member 4a, or on the inner peripheral surface of the outer tubular member 4b which are held in contact with the radially outwardly protruding lands 41 in the inner tubular member 4a. The surface projections may also be defined on both of the contact faces 9 of the inner and outer tubular members 4a and 4b.

In the meantime, the minute interstices defined by the surface projections formed on each of the contact faces 9 are those generally defined by a grinding work or a lathe work and may therefore vary finely. In other words, the surface projections on the contact faces 9 have pointed ends which are, when the inner tubular member 4a is press-fitted into the outer tubular member 4b to complete the spacer 4, depressed inwardly. The extent to which the pointed ends of the surface projections on the contact faces 9 are inwardly depressed may vary from place to place, making it difficult to manage the control of the flow of the lubricant through the minute interstices.

In the case of a bearing assembly of a type for use on a small diameter shaft, of a compact structure and/or requiring a high speed operation, the minute interstices referred to above may result in an insufficient effect of throttling the amount of flow of the lubricant and it may often occur that the amount of flow of the lubricant be further throttled. In particular, where the bearing assembly is desired to be compact in structure, the area of contact surface between component parts is limited and cannot be increased and, therefore, no sufficient throttling effect can be secured.

In view of the foregoing, a second preferred embodiment of the present invention is addressed to accomplish an easy management of the flow of the lubricant even though a variation occurs in a clearance between the component parts defining the reservoir 7 and/or the pressure used to press-fit one of the component parts relative to the other thereof, thereby improving the orifice effect exhibited at the contact faces between the component parts. This second preferred embodiment of the present invention is shown in FIG. 3.

Figure 3A:
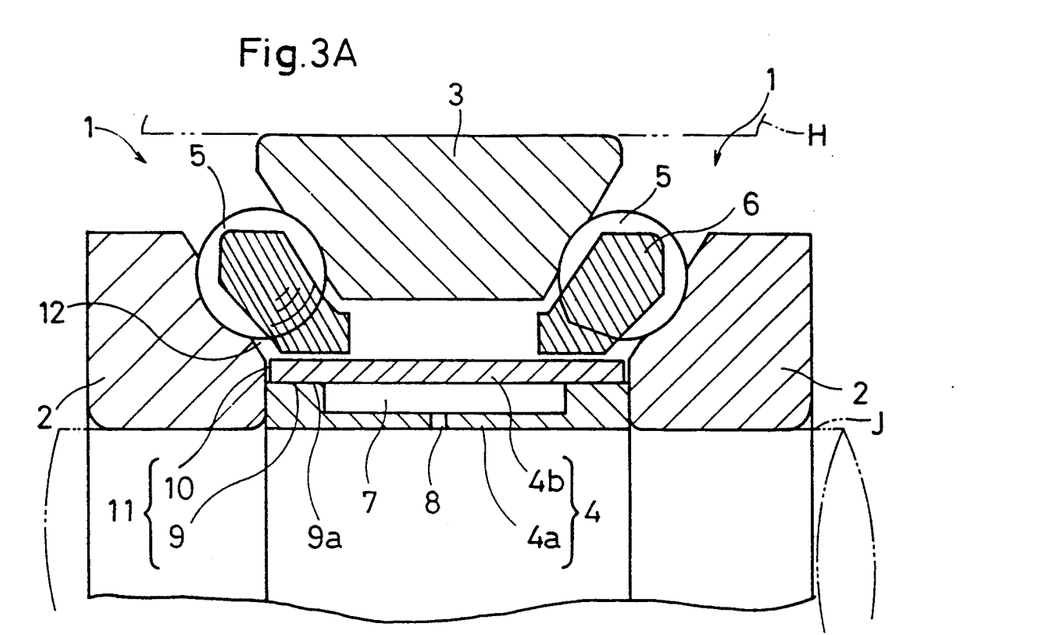
FIG. 3(A) is a fragmentary transverse sectional view of the ball bearing assembly according to a second preferred embodiment of the present invention.
Figure 3B:
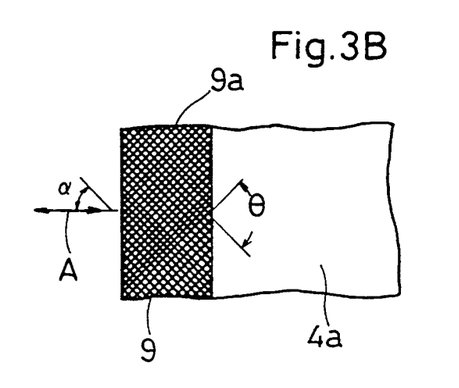
FIG. 3(B) is a fragmentary plan view of the ball bearing assembly shown in FIG. 3(A), showing a knurled pattern formed on a surface of a spacer employed in the ball bearing assembly.
Figure 3C:
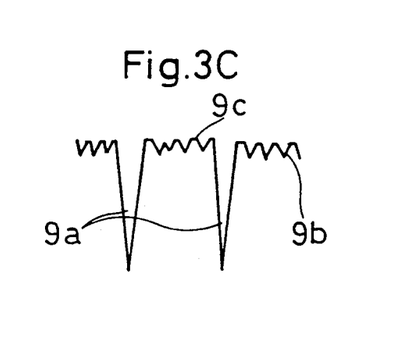
FIG. 3(C) is a fragmentary sectional view, on an enlarged scale, of a portion of the spacer in the ball bearing assembly showing the details of a mesh pattern of cross grooves formed therein.

According to the second embodiment of the present invention, while each of the contact faces 9 through which the inner tubular member 4a contacts the outer tubular member 4b is, as shown in FIG. 3(A), formed with the surface projections by surface roughening to define the minute interstices as discussed connection with the foregoing embodiment, the respective contact face 9 is ground or knurled, subsequent to the formation of the surface projections, in two directions intersecting at an angle θ relative to each other and at an angle α relative to the axial direction A of the inner tubular member 4a to define a mesh pattern of grooves 9a as shown in FIG. 3(B). As best shown in FIG. 3(C), each of the cross grooves 9a has a depth greater than the depth of each of recesses forming the minute interstices on each contact face 9 together with the surface projections, and respective tips of the surface projections on each contact face 9 is generally smoothed as indicated by 9c in FIG. 3(C).

It is to be noted that, instead of or in addition to the formation of the mesh pattern of the grooves 9a on the contact faces 9 in the inner tubular member 4a, the mesh pattern of the groove 9a may be formed on the opposite portions of the inner peripheral surface of the outer tubular member 4b which are held in contact with the contact faces 9. In the embodiment illustrated in FIG. 3, the mesh pattern of the grooves 9a is also formed on each of the opposite portions of the inner peripheral surface of the outer tubular member 4b so as to cooperate with those formed on the contact faces 9.

When it comes to the formation of the mesh pattern of the grooves 9a on each of the contact faces 9 in the inner tubular member 4a, various methods are currently available. By way of example, while the use is made of a coarse whetstone made up of relatively coarse particles, each of the contact surfaces 9 of the radially outwardly protruding lands 41 in the inner tubular member 4a is, while the inner tubular member 4a is rotated about its longitudinal axis, held in grinding contact with the whetstone while both of the inner tubular member 4a and the whetstone are relatively and reciprocatedly moved in a direction parallel to the axial direction A of the inner tubular member 4a.

Figure 4:
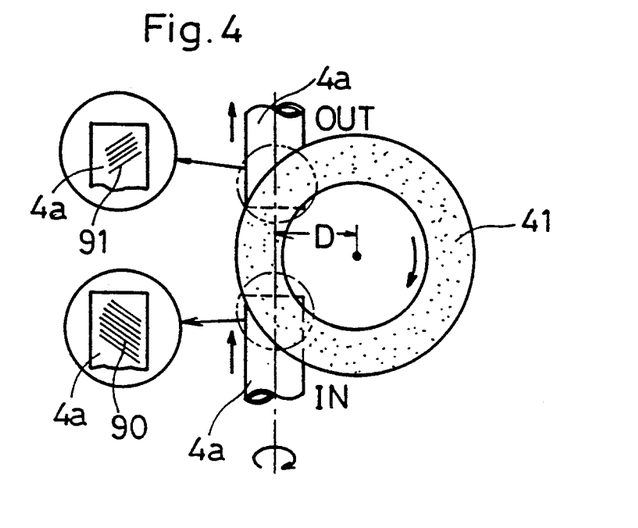
FIG. 4 is a schematic plan view showing an example of how the knurled pattern is formed in the spacer.

An alternative method which may be employed for the formation of the mesh pattern of the grooves 9a comprises, as best shown in FIG. 4, rotating a generally ring-shaped whetstone 51 at a predetermined position in one direction, and contacting the inner tubular member 4a, that is supported in position for rotation and axial movement, with the ring-shaped whetstone 51 so that portions of the inner tubular member 4a corresponding in position to infeed and outfeed sides IN and OUT of the whetstone 51 with respect to the direction of rotation thereof can be ground at the same time. With this alternative method, grooves 90 formed at the infeed side IN so as to extend generally parallel to each other in one direction and grooves 91 formed at the outfeed side OUT so as to extend generally parallel to each other in a different direction crossing said one direction are formed one over the other thereby defining the cross grooves 9a in the mesh pattern.

The angle θ of intersection between the grooves 9a extending in a first direction (i.e., the grooves 90 shown in FIG. 4) and the grooves 9a extending in a second direction (i.e., the grooves 91 shown in FIG. 4) will take a relatively great value if the amount of offset D of the inner tubular member 4a from the ring-shaped whetstone 41 is reduced. Accordingly, by adjusting the amount of offset D, the angle θ is preferably chosen to be of a value equal to or greater than 60 degrees. If the intersecting angle θ is chosen to be of the value equal to or greater than 60 degrees, the angle α in which any one of the cross grooves 9a extends relative to the axial direction A as shown in FIG. 3(B) is of a value equal to or greater than 30 degree, and hence, the amount of flow of the lubricant in a direction parallel to the axial direction A during the rotation of the inner tubular member 4a will not become excessive.

After the grinding process effected in the manner described above to form the cross grooves 9a, a surface super-finishing process, for example, a plateau honing process, is applied with the use of a fine whetstone, made up of fine particles, to the inner tubular member 4a to generally smooth the projections on the contact face 9 bound by the cross grooves 9a.

Figure 5A:
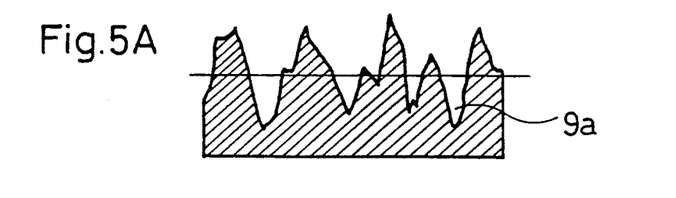
FIG. 5(A) is a schematic sectional view, on an enlarged scale, of a portion of the spacer showing the surface roughness formed by a usual grinding operation.
Figure 5B:
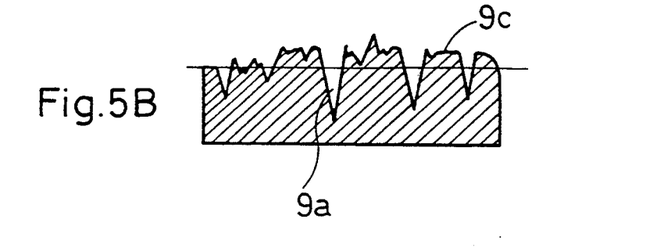
FIG. 5(B) is a view similar to FIG. 5(A), showing tips of projections of the surface roughness having been smoothed.
Figure 6:
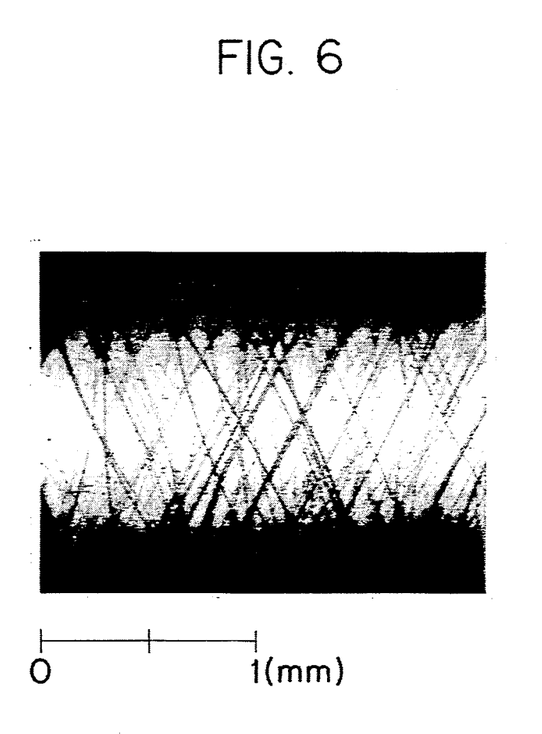
FIG. 6 is a microphotographic representation showing a longitudinal sectional view of the spacer.

FIG. 5(A) is a diagram showing, in a schematic side sectional representation, a profile of each of the contact faces 9 in the inner tubular member 4a of the spacer 4 after the usual grinding operation, while FIG. 5(B) is a diagram showing in a similar representation a profile of each of the contact faces 9 in the inner tubular member 4a of the spacer busing 4 after the surface super-finishing operation. A microphotograph of the mesh pattern of the cross grooves 9a as viewed from top is shown in FIG. 6.

According to the second embodiment of the present invention shown in FIG. 3, since surface roughness of each of the contact faces 9 are represented by the height of the tips 9c of the surface projections on each contact face 9 which have been smoothed as best shown in FIG. 3(C), it has the following advantages as compared with the case in which each contact face 9 is merely ground by the use of a grinding machine or a lathe.

Specifically, even though a variation occurs in the interference between the inner tubular member 4a and the outer tubular member 4b which receives the inner tubular member 4a inserted thereinto, a change in the minute interstices is so small that the amount of run of the lubricant can easily be managed. Since as stated above the change of the minute interstices which would occur as a result of an application of a pressing force is small, it is possible to make the surface roughness smaller for a given area of each contact face 9 to enhance the orifice effect. Moreover, even though the minute interstices are small, the formation of the relatively deep cross grooves 9a ensures a continuous and non-interrupting supply of the lubricant in a stable manner By way of example, where no sufficient length over which the inner tubular member 4a is inserted into the outer tubular member 4b is available because the angular contact bearing assembly as a whole is required to be made compact in size, and even though a relatively large interference between the inner and outer tubular members 4a and 4b is employed to firmly secure the inner and outer tubular members 4a and 4b one inside the other, the change of the minute interstices formed on each contact face 9 is so small that the amount of run of the lubricant can be managed and, hence, the amount of run of the lubricant can be minimized advantageously.

Furthermore, since some of the cross grooves 9a extend so as to intersect the remaining cross grooves 9a thereby to form the mesh pattern, it is possible to accomplish a smooth outflow of the lubricant by aligning the direction of inclination of the cross grooves 9a regardless of the direction of a rotary shaft J on which the bearing assembly is mounted. The formation of the cross grooves 9a can readily be attained by the use of any one of the aforementioned known machining or cutting process.

Figure 7:
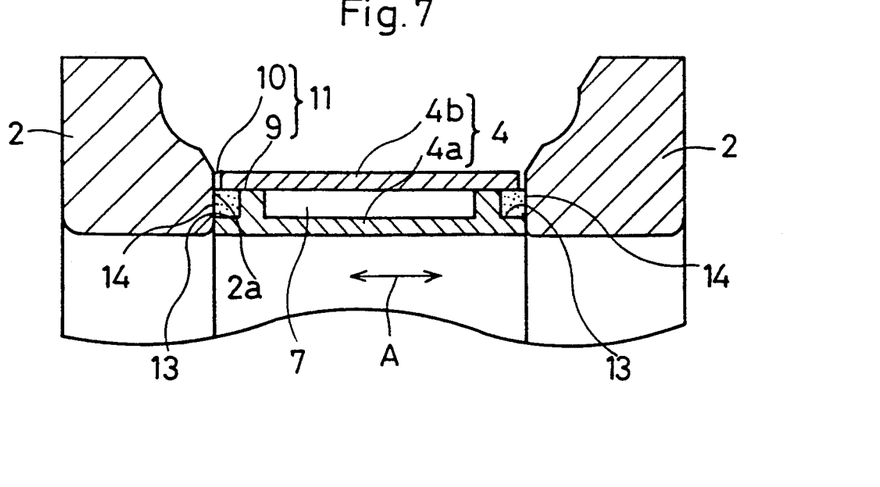
FIG. 7 is a fragmentary transverse sectional view of the ball bearing assembly according to a third preferred embodiment of the present invention.

A third preferred embodiment of the present invention is shown in FIG. 7. In this embodiment, an additional reservoir 13 is formed in each of opposite annular end faces of the inner tubular member 4a which are held in contact with the annular end faces 2a of the associated first and second inner races 2. The additional reservoirs 13 so formed are positioned on respective sides of the reservoir 7 with respect to the axial direction A of the spacer 4 and are communicated therewith through the minute interstices formed on the contact faces 9. Each of the additional reservoirs 13 is filled up by a porous material 14 operable to retain the lubricant therein. The porous material 14 in each additional reservoir 13 may be a sintered metal alloy, an open-celled block of synthetic resin, a felt or any other suitable material capable of retaining the lubricant soaked therein. It is to be noted that the porous material 14 is preferably placed in position within the respective additional reservoir 13 after it has been soaked in the lubricant.

According to the third embodiment of the present invention, the lubricant retained in the porous materials 14 can be supplied into the spaces 12, defined between the inner and outer races 2 and 3, radially outwardly through the annular gaps 10 under the influence of a centrifugal force developed during the rotation of the inner races 2 relative to the common outer race 3 to lubricate track faces defining the spaces 12. At this time, the lubricant flowing radially outwardly through the annular gaps 10 will not flow into the reservoir 7 through the minute interstices on the contact faces 9. Because of this, the use of the lubricant retaining porous materials 14 within the additional reservoirs 13 is advantageously applied in the case where a relatively large amount of lubricant is desired to be supplied into the spaces 12 at the start of use of the angular contact bearing assembly of the present invention. The lubricant within the reservoir 7 is, after having flow axially through the minute interstices, soaked in the porous materials 14 in the additional reservoirs 13 and is subsequently supplied into the spaces 12 radially outwardly through the annular gaps 10. Therefore, even though one or both of the annular gaps 10 may have an increased width due to a variation in machining or assemblage, no abrupt flow of the lubricant into the annular gaps 10 will take place and a stable supply of the lubricant into the spaces 12 is possible.

It is to be noted that in any one of the foregoing embodiments the spacer 4 has been described and shown as comprised of the two component parts, namely, the inner and outer tubular members 4 and 4b. However, according to a fourth preferred embodiment of the present invention shown in FIG. 8, the spacer 4 is comprised of a single tubular member having a substantial wall thickness and also having a pair of circumferentially extending annular reservoirs 15 defined therein by recessing the single tubular member axially inwardly from its opposite end faces 40 adjacent the respective end faces 2a of the first and second inner races 2.

Figure 8:
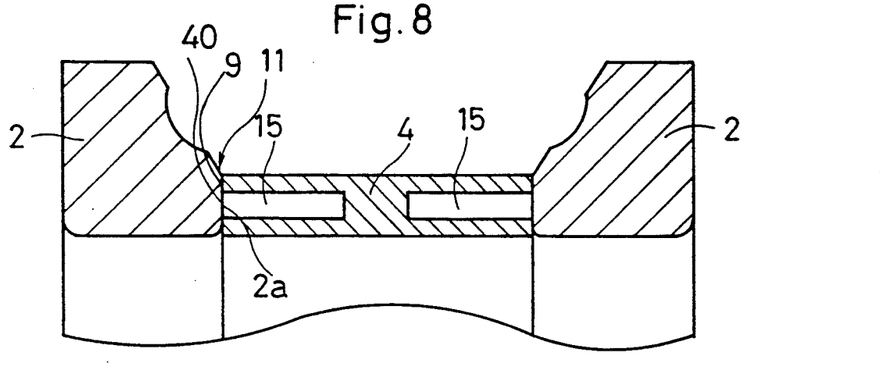
FIG. 8 is a fragmentary transverse sectional view of the ball bearing assembly according to a fourth preferred embodiment of the present invention.

In this fourth embodiment of the present invention shown in FIG. 8, the lubricant flow passage 11 through which the lubricant within each of the annular reservoirs 15 is defined by the contact face 9 comprised of the end face 2a of the associated first or second inner race 2 and a radially outer annular end face portion of the tubular member of the spacer 4 adjacent the common outer race 3 (FIG. 1).

Figure 9:
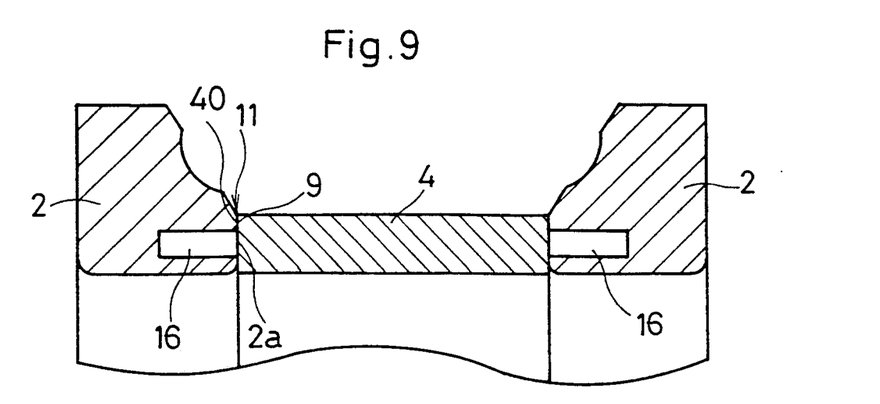
FIG. 9 is a fragmentary transverse sectional view of the ball bearing assembly according to a fifth preferred embodiment of the present invention.

In a fifth preferred embodiment of the present invention shown in FIG. 9, while the spacer 4 is in the form of a single tubular member having a substantial wall thickness, a circumferentially extending annular reservoir 16 is formed in each of the first and second inner races 2 so as to be depressed axially inwardly from the associated end face 40 of the spacer 4. The lubricant flow passage 11 in this instance is defined between each of the annular end faces 40 of the spacer 4 and a radially outer annular end face portion of the annular end face 2a of the associated first or second inner race 2.

In any one of the fourth and fifth embodiments of the present invention shown respectively in FIGS. 8 and 9, if desired, the annular gap 10 discussed in connection with the first embodiment of the present invention may be formed between the spacer 4 and each of the first and second races 2 to facilitate the supply of the lubricant in an increased quantity.

If desired, the annular reservoirs 15 according to the embodiment of FIG. 8 and the annular reservoirs 16 according to the embodiment of FIG. 9 may be concurrently employed in communication with each other.

Figure 10:
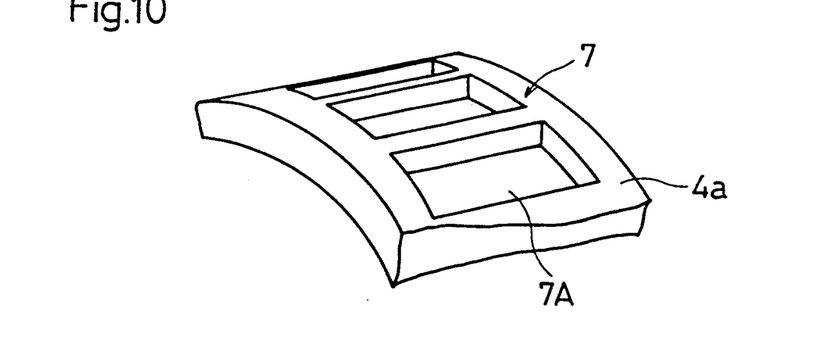
FIG. 10 is a fragmentary transverse sectional view of the ball bearing assembly according to a sixth preferred embodiment of the present invention.

In describing any one of the first, second and third embodiments of the present invention, the reservoir 7 has been described as defined in the spacer 4 so as to extend circumferentially thereof in a coaxial relation with the axis of rotation of the inner races 2. However, instead of the use of the circumferentially extending single reservoir 7, a plurality of reservoirs 7A of a similar shape may be employed. This is illustrated in FIG. 10 as a sixth preferred embodiment of the present invention. As shown in FIG. 10, the inner tubular member 4a is shown to have a circumferential row of generally rectangular recesses which, when the inner tubular member 4a is placed inside the outer tubular member 4b in a manner similar to that shown in any one of FIGS. 1, 3(A) and 7, forms the separate reservoirs 7A.

Similarly, the idea of use of the separate reservoirs 7 suggested according to the sixth embodiment of the present invention as shown in FIG. 10 may be applicable to each of the annular reservoirs 15 shown in FIG. 8 and also to each of the annular reservoirs 16 shown in FIG. 9.

Figure 11:
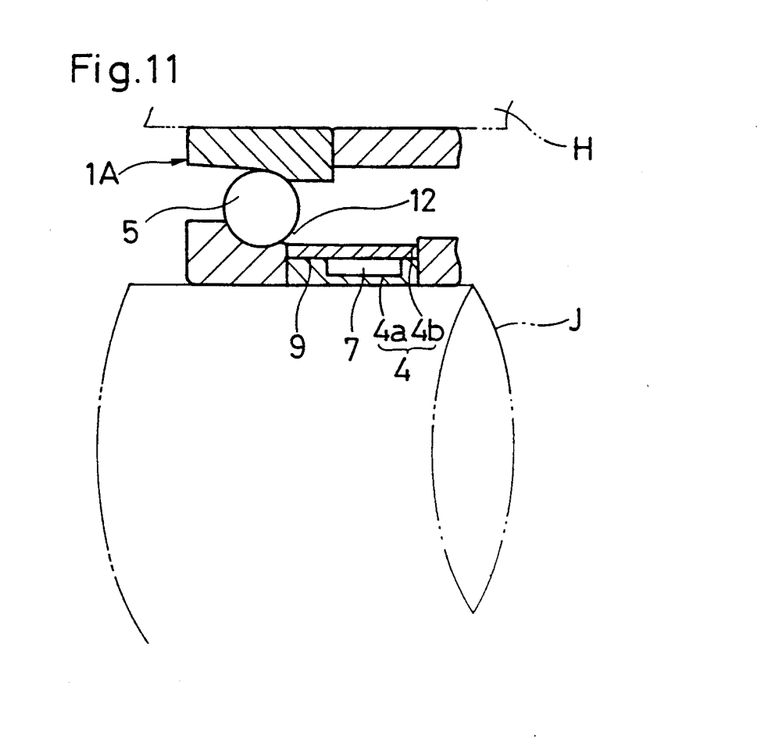
FIG. 11 is a fragmentary transverse sectional view of the ball bearing assembly according to a seventh preferred embodiment of the present invention.

In the foregoing description of any one of the first to sixth embodiments of the present invention reference has been made to the dual angular contact bearing assembly. However, according to a seventh preferred embodiment of the present invention, the present invention is equally applicable to a single angular contact bearing assembly 1A as shown in FIG. 11, or any other rolling contact bearing assembly in general. In the embodiment shown in FIG. 7, the spacer 4 in the single angular contact bearing assembly 1A is provided with the reservoir 7 and also with the minute interstices defined on each of the contact faces 9.

Again, in any one of the third to seventh embodiments of the present invention shown in FIGS. 7 to 11, respectively, contact faces corresponding in function to the contact faces 9 may be surface roughened in a manner similar to such contact faces 9 as discussed with reference to FIG. 2 with or without such cross grooves 9a as shown in FIG. 3.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A rolling contact bearing assembly adapted to be interposed between first and second elements rotatable relative to each other, said bearing assembly comprising:

an inner race member mounted on the first element and including at least an inner race and a spacer disposed axially adjacent the inner race;
an outer race mounted on the second element;
a plurality of rolling elements operatively disposed in a space defined between the outer race and the inner race;
said inner race member having a lubricant reservoir defined therein for accommodating a lubricant therein; and
a lubricant flow passage communicating the reservoir with the space defined between the outer race and the inner race for lubricating the rolling elements, at least a portion of said lubricant flow passage being defined by minute interstices which are formed by a surface roughness at mutual contact faces of a plurality of component parts forming the inner race member.

2. The rolling contact bearing assembly as claimed in claim 1, wherein said surface roughness is formed by projections and recesses and wherein at least one of said contact faces has a mesh pattern of cross grooves, each of said grooves having a depth greater than that of any one of the recesses, said projections having their tips smoothed.

3. The rolling contact bearing assembly as claimed in claim 1, wherein said spacer is of a two-piece construction including inner and outer components fitted with each other while defining the reservoir therebetween, said inner and outer components defining the reservoir therebetween, and wherein said contact faces are constituted by respective contact faces therebetween lying in an axial direction.

4. The rolling contact bearing assembly as claimed in claim 3, wherein said lubricant flow passage is defined between an end face of the inner race and a corresponding end face of said outer component which is held in contact with said end face of the inner race, said lubricant flow passage including a gap through which the lubricant flow into each of the space defined between the inner and outer races.

5. The rolling contact bearing assembly as claimed in claim 4, wherein an end portion of the spacer which is held in contact with the end face of said inner race is filled with a porous material for temporarily retaining the lubricant, which has flow from the reservoir through the minute interstices between the contact faces, and then allowing the lubricant to subsequently flow into the space defined between the inner and outer races.

6. The rolling contact bearing assembly as claimed in claim 3, wherein an end portion of the spacer which is held in contact with the end face of said inner race is filled with a porous material for temporarily retaining the lubricant, which has flow from the reservoir through the minute interstices between the contact faces, and then allowing the lubricant to subsequently flow into the space defined between the inner and outer races.

7. The rolling contact bearing assembly as claimed in claim 3, wherein said reservoir is formed by a plurality of reservoirs arranged in a row extending circumferentially of the inner race member in spaced relationship with each other.

8. The rolling contact bearing assembly as claimed in claim 1, wherein said reservoir formed in said inner race opens at an end face of said inner race which is held in contact with an end face of the spacer.

9. The rolling contact bearing assembly as claimed in claim 1, wherein the bearing assembly includes a double angular contact bearing having a pair of ball bearings including the first and second inner races, respectively, said spacer being interposed between said first and second inner races.

10. The rolling contact bearing assembly as claimed in claim 1, wherein said reservoir is formed in an annular shape coaxial with the inner race member.

11. The rolling contact bearing assembly as claimed in claim 1, wherein said reservoir formed in the spacer opens at an end face of the spacer which is held in contact with an end face of said inner races.

12. The rolling contact bearing assembly as claimed in claim 1, wherein the surface roughness has a maximum height within the range of 0.2 to 5 μm.

* * * * *